United States Patent [19]

You

[11] Patent Number: 5,832,174
[45] Date of Patent: Nov. 3, 1998

[54] VIDEOCASSETTE RECORDER FOR RECORDING AND REPRODUCING A PLURALITY SIGNALS

[75] Inventor: Hang-du You, Suwon, Rep. of Korea

[73] Assignee: Samsung Electronics, Kyungki-Do, Rep. of Korea

[21] Appl. No.: 628,349

[22] Filed: Apr. 5, 1996

[30] Foreign Application Priority Data

Jul. 20, 1995 [KR] Rep. of Korea ............... 1995 21405

[51] Int. Cl.⁶ ........................... H04N 5/91; H04N 5/95
[52] U.S. Cl. ........................... 386/92; 386/88; 386/66
[58] Field of Search ............... 386/95, 92, 101, 386/85, 66, 88, 119, 13, 16, 108; 360/61, 63, 64; H04N 5/91, 5/95

[56] References Cited

U.S. PATENT DOCUMENTS

| | | | |
|---|---|---|---|
| 4,862,292 | 8/1989 | Enari et al. | 386/92 |
| 5,395,138 | 3/1995 | Tomita | 386/92 |
| 5,434,723 | 7/1995 | Aoki | 360/70 |
| 5,502,573 | 3/1996 | Fujinami | 386/95 |

*Primary Examiner*—Robert Chevalier
*Attorney, Agent, or Firm*—Sughrue, Mion, Zinn, Macpeak & Seas

[57] ABSTRACT

A videocassette recorder for independently recording and reproducing two or more video signals on a tape is provided. The videocassette recorder includes a first digital time compressor and restorer, a second digital time compressor and restorer, a synchronizing portion, a first recording and reproducing circuit, a second recording and reproducing circuit, a first switching portion, and a second switching portion.

15 Claims, 3 Drawing Sheets

FIG.2H

VIDEOCASSETTE RECORDER FOR RECORDING AND REPRODUCING A PLURALITY SIGNALS

BACKGROUND OF THE INVENTION

The present invention relates to a videocassette recorder, and more particularly, to a videocassette recorder for recording and reproducing more than one video signal.

In a first conventional multiple recording method, two or more video signals are simultaneously displayed to be resolved in two or more predetermined regions of a screen. The composite screen information is then recorded. According to another conventional multiple recording method, first and second channels record first and second field signals to constitute a single frame from the two recorded signals. In the conventional recording methods described above, a plurality of signals become one composite signal, and it is not possible to independently record, reproduce or edit each constituent signal.

SUMMARY OF THE INVENTION

Accordingly, a videocassette recorder is provided for simultaneously recording or reproducing two signals, allowing independent reproduction, recording and editing of each signal.

To accomplish the above object, there is provided a videocassette recorder for recording and reproducing signals including a first digital time compressor and/or restorer for compressing or restoring a first video signal by a time base and for generating a sync request signal to avoid overlapping of the first video signal and a second video signal; a second digital time compressor and/or restorer for compressing or restoring a second video signal by a time base; a synchronizing means for receiving an output signal from the second digital time compressor and the sync request signal from the first digital time compressor, and then synchronizing an output signal of the first digital compressor and the output signal of the second digital compressor to prevent the first and second signals from overlapping each other; a first recording and/or reproducing circuit for receiving the output signal of the first digital time compressor and/or restorer, and then recording or reproducing the same; a second recording and/or reproducing circuit for recording or reproducing the second video signal passing through the synchronizing means; a first switching means for alternately switching the output signals of the first and second recording and/or reproducing circuits using a signal output from a cylinder controller; and a second switching means connected to the first switching means for alternately switching the output signals of the first and second recording and/or reproducing circuits to first and second channel heads by a signal output from the cylinder controller.

BRIEF DESCRIPTION OF THE DRAWINGS

The above objects and advantages of the present invention will become more apparent by describing in detail a preferred embodiment thereof with reference to the attached drawings in which:

FIGS. 2A through 2H show timing diagrams for illustrating the operation of a videocassette recorder according to the present invention.

DETAILED DESCRIPTION OF THE INVENTION

Figure 1:
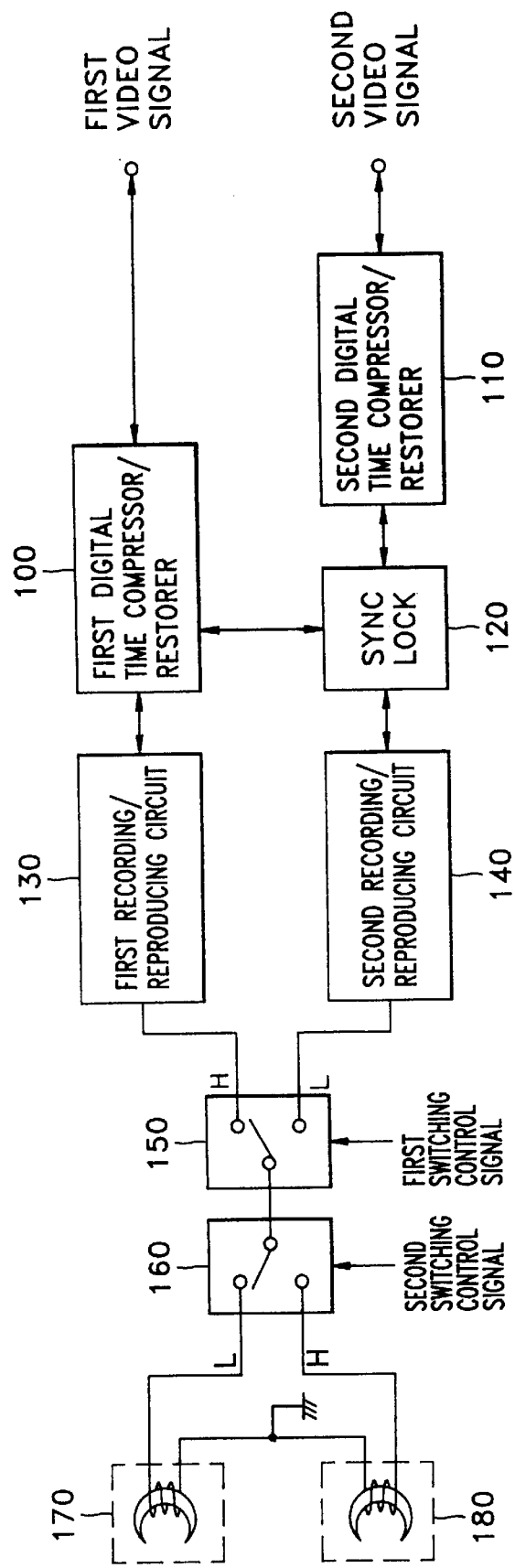
FIG. 1 is a block diagram for showing construction of a videocassette recorder according to the present invention.

FIG. 1 is a block diagram of a videocassette recorder for independently recording and reproducing more than two signals according to the present invention. Here, reference numerals 100 and 110 indicate first and second digital time compressor and/or restorers, reference numeral 120 indicates a synchronizing portion (SYNC LOCK), reference numerals 130 and 140 indicate first and second recording and/or reproducing circuits, reference numeral 150 indicates a first switching portion switched by a first switching control signal output from a cylinder controller (not shown), reference numeral 160 indicates a second switching portion switched by a second switching control signal output from the cylinder controller (not shown), and reference numerals 170 and 180 indicate first and second channel heads.

A recording operation of two video signals will first be described. A first video signal input into the first digital time compressor 100 is compressed by a time base, and then converted into a signal for recording on a tape through the first recording circuit 130. The first digital time compressor 100 compresses the first video signal by the time base and also transmits a sync request signal (SYNC_REQ) to the SYNC LOCK 120 to prevent the first video signal from overlapping with a second video signal. The first video signal is converted into the record signal through the first recording circuit 130. When the first switching portion 150 is switched to the "H" position, the record signal is input into the first channel head 170 or the second channel head 180 according to a switching state of the second switching portion 160.

Meanwhile, the second video signal input into the second digital time compressor 110 is compressed by a time base, then input into the SYNC LOCK 120. The SYNC LOCK 120 synchronizes the second video signal so that the first video signal does not overlap with the second video signal in response to the sync request signal from the first digital time compressor 100. Subsequently, the synchronized second video signal is input into the second recording circuit 140 to produce a second record signal. When the first switching portion is switched to the "L" position, the record signal is input to the first channel head 170 or second channel head 180 according to a switching state of the second switching portion 160.

Figure 2A:
Figure 2B:
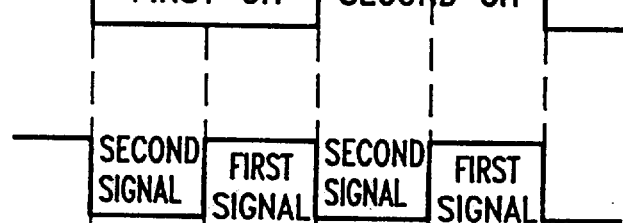
Figure 2C:
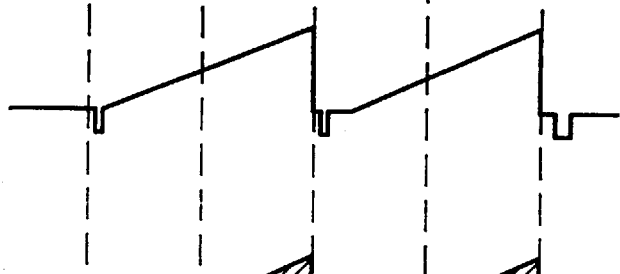
Figure 2D:
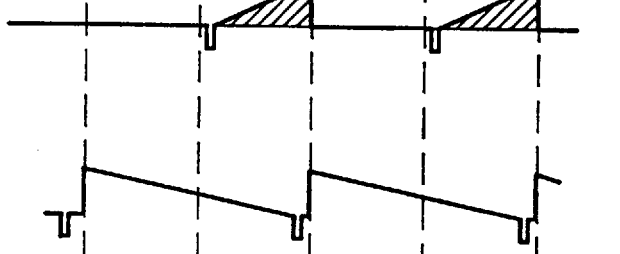
Figure 2E:
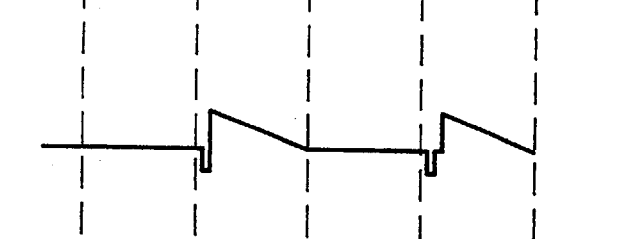
Figure 2F:
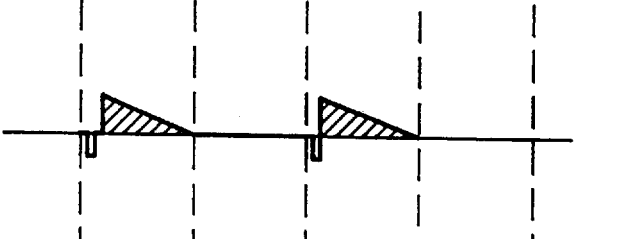
Figure 2G:
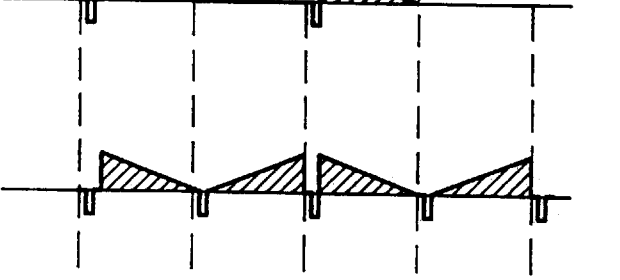

Referring to FIGS. 2A through 2H, showing timing diagrams for the above description, FIG. 2C shows a waveform of the first video signal where the first video signal is compressed into a signal as shown in FIG. 2D, through the first digital time compressor 100. FIG. 2E shows a waveform of the second video signal, where the second video signal is compressed into a signal as shown in FIG. 2F, through the second digital time compressor 110. The signals of FIGS. 2D and 2F are synchronized through the SYNC LOCK 120 to avoid overlapping with each other. The synchronized signals are shown in FIGS. 2D and 2G.

Figure 3:
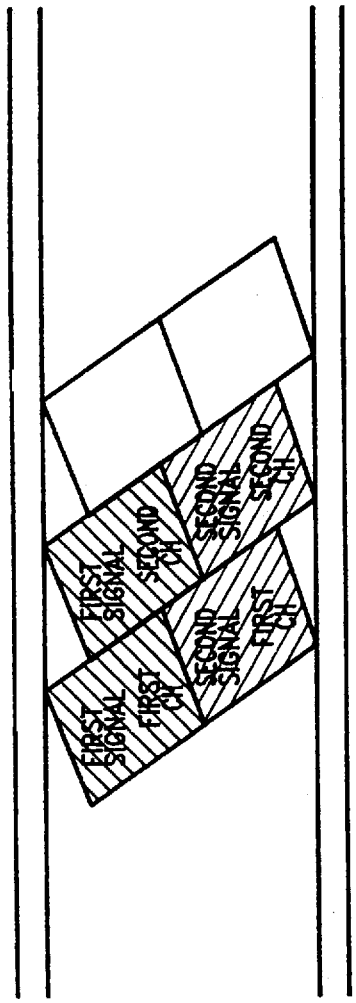
FIG. 3 is a sectional view of a magnetic tape on which two signals are alternately recorded.

The first switching portion 150 is operated by the signal as shown in FIG. 2B, and the second switching portion 160 is operated by the signal as shown in FIG. 2A. That is, the second switching portion 160 of FIG. 1 is switched such that when the signal of FIG. 2A is low, the first channel head 170 operates, but when the signal is high, the second channel head 180 operates. Accordingly, the video signals are recorded on the tape as shown in FIG. 3. Here, when the signals are transmitted from the first switching portion 150 to the second switching portion 160, the two signals are alternately recorded as shown in FIG. 2H.

The recorded signals can be reproduced by reversing the order of the recording process described above. More particularly, the signal to be reproduced is read by the first or second channel head 170 or 180, respectively, according to the state of the second switching portion 160. During the high state of the first switching means 150, a first signal is reproduced by the first reproducing circuit 130 to provide a first compressed video signal. The compressed signal is restored by the first restorer circuit 100 to produce a first video signal for display. Similarly, during the low state of the first switching means 150, a second signal is reproduced by the second reproducing circuit 140 to provide a second compressed video signal. The compressed signal is restored by the second restorer circuit 110, after being synchronized by sync lock circuit 120, to produce a second video signal for display.

In addition, the number of independently recorded and reproduced signals can be increased according to the number of time compressor and/or restorers.

According to the present invention, a videocassette recorder for recording and reproducing a plurality of signals can record, reproduce, and edit each signal independently.

What is claimed is:

1. A videocassette recorder for recording signals comprising:
    a first digital time compressor for compressing a first video signal by a time base and generating a sync request signal to avoid overlap of said first video signal with a second video signal;
    a second digital time compressor for compressing said second video signal by a time base;
    a synchronizing means for receiving a second output signal from said second digital time compressor and said sync request signal from said first digital time compressor, and for synchronizing a first output signal of said first digital time compressor and said second output signal of said second digital time compressor to prevent said outputs from said first and second time compressors from overlapping each other and to produce a synchronized second signal;
    a first recording circuit for receiving said first output signal of said first digital time compressor, and for recording the same;
    a second recording circuit for receiving said synchronized second signal and for recording the same;
    a first switching means for switching said output signals of said first and second recording circuits according to a first signal; and
    a second switching means connected to said first switching means for switching said output signals of said first and second recording circuits to first and second channel heads according to a second signal.

2. A videocassette recorder for reproducing time compressed signals comprising:
    a first channel head;
    a second channel head;
    a first switch responsive to a first signal to read time compressed recorded signals with said first and second channel heads in accordance with said first signal;
    a second switch responsive to a second signal to switch between signals read by said first and second channel heads;
    a first reproducing means for receiving a read signal when said second switch is in a first state and for reproducing a first time compressed signal;
    a second reproducing means for receiving a read signal when said second switch is in a second state and for reproducing a second time compressed signal;
    a synchronizing circuit to shift said second time compressed signal;
    a first time restorer circuit to restore said first time compressed circuit to produce a first video signal; and
    a second time restorer circuit to restore said shifted second time compressed circuit to produce a second video signal.

3. A videocassette recorder of claim 1, wherein said videocassette recorder also reproduces video signals from compressed recorded signals from signals read by said first and second channel heads, said recorder further comprising:
    a first reproducing means responsive to said first signal of said first switching means to produce a first time compressed signal from signals read by said first and second channel heads;
    a second reproducing means responsive to said second signal of said second switching means to produce a second time compressed signal from signals read by said first and second channel heads;
    a first time restorer circuit to restore said first time compressed signal to produce a first video signal;
    a second time restorer circuit to restore said second time compressed signal, after said second time compressed signal is synchronized by said synchronizing means, to produce a second video signal.

4. A video cassette recorder of claim 1, wherein said first switching means inputs said output signals from both said first and second recording circuits and selectively outputs one of said output signals as a selected signal based on said first signal, and
    wherein said second switching means inputs said selected signal and outputs said selected signal to said first and second channel heads based on said second signal.

5. A video cassette recorder of claim 4, wherein said second switching means selectively outputs said selected signal to either said first channel head or second channel head based on said second signal.

6. A video cassette recorder of claim 5, wherein said first switching means selectively outputs said output signal from said first recording circuit as said selected signal when said first signal sets said first switching means in a first state of said first switching means,
    wherein said first switching means selectively outputs said output signal from said second recording circuit as said selected signal when said first signal sets said first switching means in a second state of said first switching means,
    wherein said second switching means selectively outputs said selected signal to said first channel head when said second signal sets said second switching means in a first state of said second switching means, and
    wherein said second switching means selectively outputs said selected signal to said second channel head when said second signal sets said second switching means in a second state of said second switching means.

7. A video cassette recorder of claim 1, wherein said first recording circuit does not output any signals which correspond to said second video signal and said second recording circuit does not output any signals which correspond to said first video signal.

8. A videocassette signals comprising:
    a first digital time compressor for compressing a first video signal by a time base to produce a compressed first video signal;

a second digital time compressor for compressing a second video signal by a time base to produce a compressed second video signal, wherein said first digital time compressor also generates a sync request signal;

a synchronizing circuit which receives said compressed second video signal and said sync request signal and which synchronizes said compressed second video signal with said compressed first video signal based on said sync request signal to produce a synchronized second video signal;

a first recording circuit which receives said compressed first video signal from said first digital time compressor and outputs a corresponding first recording signal;

a second recording circuit which receives said synchronized second video signal from said synchronizing circuit and outputs a corresponding second recording signal;

a first switching circuit which inputs said first recording signal and said second recording signal and outputs said first recording signal and said second recording signal according to a first signal; and a second switching circuit which is connected to said first switching circuit and which switches at least one output signal from said first switching circuit to first and second channel heads according to a second signal.

9. A video cassette recorder of claim 8, wherein said first switching circuit selectively outputs either said first recording signal or said second recording signal as a selected signal based on said first signal, wherein said second switching circuit inputs said selected signal and outputs said selected signal to said first and second channel heads based on said second signal.

10. A video cassette recorder of claim 9, wherein said second switching circuit selectively outputs said selected signal to either said first channel head or second channel head based on said second signal.

11. A video cassette recorder of claim 10, wherein said first switching circuit selectively outputs said first recording signal as said selected signal when said first signal sets said first switching circuit in a first state of said first switching circuit, wherein said first switching circuit selectively outputs said second recording signal as said selected signal when said first signal sets said first switching circuit in a second state of said first switching circuit, wherein said second switching circuit selectively outputs said selected signal to said first channel head when said second signal sets said second switching circuit in a first state of said second switching circuit, and wherein said second switching circuit selectively outputs said selected signal to said second channel head when said second signal sets said second switching circuit in a second state of said second switching circuit.

12. A video cassette recorder of claim 8, wherein said first recording circuit does not output any signals which correspond to said second video signal and said second recording circuit does not output any signals which correspond to said first video signal.

13. A video cassette recorder of claim 2, wherein said first switch inputs a first time compressed recorded signal from said first channel head and a second time compressed recorded signal from said second channel head and selectively outputs either said first time compressed recorded signal or said second time compressed recorded signal as a selected signal based on said first signal, and wherein said second switch inputs said selected signal and outputs said selected signal as said read signal to said first reproducing means and said second reproducing means based on said second signal.

14. A video cassette recorder of claim 13, wherein said second switching means selectively outputs said selected signal as said read signal to either said first reproducing means or second reproducing means based on said second signal.

15. A videocassette recorder for reproducing time compressed signals comprising:

a first channel head;

a second channel head;

a first switch which reads a first time compressed recorded signal from said first channel head and a second time compressed recorded signal from said second channel head in accordance with a first signal and selectively outputs said first time compressed recorded signal or said second time compressed recorded signal as a selected signal;

a second switch which is inputs said selected signal and selectively outputs said selected signal as a first reproduced signal or a second reproduced signal in accordance with a second signal;

a first reproducing means which receives said first reproduced signal and outputs a corresponding a first time compressed signal;

a second reproducing means which receives said second reproduced signal and outputs a corresponding a second time compressed signal;

a synchronizing circuit which shifts said second time compressed signal with respect to said first time compressed signal to produce a shifted second signal in order to synchronize said first time compressed signal and said second time compressed signal;

a first time restorer circuit to restore said first time compressed signal to produce a first video signal; and a second time restorer circuit to restore said shifted second signal to produce a second video signal.

* * * * *